US006795072B1

(12) United States Patent
Lewis (10) Patent No.: US 6,795,072 B1
(45) Date of Patent: Sep. 21, 2004

(54) METHOD AND SYSTEM FOR RENDERING MACROPIXELS IN A GRAPHICAL IMAGE

(75) Inventor: Michael C. Lewis, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 7 days.

(21) Appl. No.: 09/589,648

(22) Filed: Jun. 7, 2000

Related U.S. Application Data (63) Continuation of application No. 09/374,071, filed on Aug. 12, 1999, now abandoned.

(51) Int. Cl.[7] .............................................. G06T 11/20
(52) U.S. Cl. ..................................................... 345/441
(58) Field of Search ................................ 345/441, 635, 345/442, 443, 614

(56) References Cited

U.S. PATENT DOCUMENTS

| | | | | |
|---|---|---|---|---|
| 4,873,515 A | * | 10/1989 | Dickson et al. ............. | 345/443 |
| 5,444,839 A | * | 8/1995 | Silverbrook et al. ........ | 345/441 |
| 5,446,836 A | * | 8/1995 | Lentz et al. ................. | 345/441 |
| 5,544,294 A | * | 8/1996 | Cho et al. .................... | 345/426 |
| 5,598,517 A | * | 1/1997 | Watkins ....................... | 345/426 |
| 5,701,405 A | * | 12/1997 | Kelley et al. ................ | 345/441 |
| 5,748,202 A | * | 5/1998 | Nakatsuka et al. .......... | 345/556 |
| 5,808,627 A | | 9/1998 | Kelley et al. ................ | 345/441 |
| 5,870,105 A | * | 2/1999 | Jensen ......................... | 345/419 |
| 5,872,902 A | * | 2/1999 | Kuchkuda et al. .......... | 345/615 |
| 5,982,384 A | | 11/1999 | Prouty et al. ................ | 345/441 |
| 6,016,151 A | | 1/2000 | Lin .............................. | 345/582 |
| 6,034,699 A | | 3/2000 | Wong et al. ................. | 345/441 |
| 6,104,407 A | * | 8/2000 | Aleksic et al. .............. | 345/428 |

* cited by examiner

Primary Examiner—Michael Razavi
Assistant Examiner—Ryan Yang
(74) Attorney, Agent, or Firm—Sawyer Law Group LLP

(57) ABSTRACT

A method and system for providing a graphical image on a display is disclosed. The display includes a plurality of pixels. The data includes a plurality of fragments for the at least one object. The plurality of fragments intersects a portion of the plurality of pixels. The method and system include defining a plurality of macro-pixels. Each of the plurality of macro-pixels includes a second portion of the plurality of pixels. The second portion of the plurality of pixels are adjacent and include n pixels of the second portion of the plurality of pixels in a first direction and m pixels of the second portion of the plurality of pixels in a second direction. The method and system further include rendering the plurality of pixels by rendering a plurality of macro-pixels in raster order. In one aspect, each macro-pixel is rendered by rendering the second portion of the plurality of pixels pixel by pixel. Each of the second portion of the plurality of pixels is rendered by rendering the fragments intersecting the pixel. In another aspect, each macro-pixel is rendered by rendering macro-fragments intersecting the macro-pixel. Each macro-fragment intersecting a macro-pixel includes the fragments for a particular polygon that intersect the macro-pixel. The data is then output pixel by pixel. An output for each pixel includes a first portion of the plurality of fragments that intersect the pixel.

14 Claims, 10 Drawing Sheets

METHOD AND SYSTEM FOR RENDERING MACROPIXELS IN A GRAPHICAL IMAGE

CROSS-REFERENCE TO RELATED APPLICATIONS

This application is a continuation of application Ser. No. 09/374,071 files Aug. 12, 1999, now abandoned.

The present invention is related co-pending U.S. patent application Ser. No. 08/624,261, entitled "METHOD AND APPARATUS FOR IDENTIFYING AND ELIMINATING THREE-DIMENSIONAL OBJECTS VISUALLY OBSTRUCTED FORM A PLANAR SURFACE" filed on Mar. 29, 1996 and assigned to the assignee of the present application. The present invention is also related to co-pending U.S. patent application Ser. No. 08/624,260, entitled "GRAPHICS PROCESSORS, SYSTEM AND METHOD FOR GENERATING SCREEN PIXELS IN RASTER ORDER UTILIZING A SINGLE INTERPOLATOR" filed on Mar. 29, 1996 and assigned to the assignee of the present application. The present application is also related to co-pending U.S. patent application Ser. No. 09/239,413, entitled "METHOD AND SYSTEM FOR PROVIDING EDGE ANTIALIASING" filed on Jan. 28, 1999 and assigned to the assignee of the present application.

FIELD OF THE INVENTION

The present invention relates to graphics processing in a computer system, more particularly to a method and system for more efficiently rendering a graphical image.

BACKGROUND OF THE INVENTION

A conventional computer graphics system can display a graphical image on a display. The graphical image typically includes a plurality of objects. The display includes a plurality of display elements, known as pixels, typically arranged in a grid. In order to display objects, the conventional computer graphics system typically breaks the objects into a plurality of polygons. The conventional system then typically renders the polygons in a particular order. For a three-dimensional scene, the polygons are generally rendered from back to front as measured from the viewing plane of the display. Similarly, a two-dimensional scene can be displayed where polygons are rendered based on their layer. Shallower layers occlude deeper layers.

In order to render the graphical image conventional systems typically render the plurality of objects polygon by polygon. Typically, a display list is built. The display list provides the polygons in the order in which the polygons are to be rendered. The a conventional graphics system then typically renders a first polygon on the display list, regardless of the number or locations of pixels the polygon intersects. The data for pixels in the polygon are typically rendered from left to right and top to bottom in the polygon. The conventional system continues rendering the graphical image, polygon by polygon, until all polygons have been rendered. In another conventional system, tiles are rendered. A tile is typically a two dimensional square containing n×n pixels. In order to render the tile, the pixels are rendered from left to right and top to bottom in the tile.

Although these conventional methods function, one of ordinary skill in the art will readily realize that it is desirable to provide data for an image in raster order. Furthermore, it would desirable if the image is efficiently rendered.

Accordingly, what is needed is a system and method for more efficiently rendering a graphical image. The present invention addresses such a need.

SUMMARY OF THE INVENTION

The present invention provides a method and system for providing a graphical image on a display. The display includes a plurality of pixels. The data includes a plurality of fragments for the at least one object. The plurality of fragments intersects a first portion of the plurality of pixels. The method and system comprise defining a plurality of macro-pixels. Each of the plurality of macro-pixels includes a second portion of the plurality of pixels. The second portion of the plurality of pixels are adjacent and include n pixels of the second portion of the plurality of pixels in a first direction and m pixels of the second portion of the plurality of pixels in a second direction. The method and system further comprise rendering the plurality of pixels by rendering a plurality of macro-pixels in raster order. In one aspect, each macro-pixel is rendered by rendering the second portion of the plurality of pixels pixel by pixel. Each of the second portion of the plurality of pixels is rendered by rendering the fragments intersecting the pixel. In another aspect, each macro-pixel is rendered by rendering macro-fragments intersecting the macro-pixel. Each macro-fragment intersecting a macro-pixel includes the fragments for a particular polygon that intersect the macro-pixel. The data is then output pixel by pixel. An output for each pixel includes a first portion of the plurality of fragments that intersect the pixel.

According to the system and method disclosed herein, the present invention provides the graphical image while taking into account coherency that may exist between pixels in multiple dimensions. Thus, operations such as texture mapping or caching may be more efficient.

DETAILED DESCRIPTION OF THE INVENTION

The present invention relates to an improvement in processing of graphical images. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
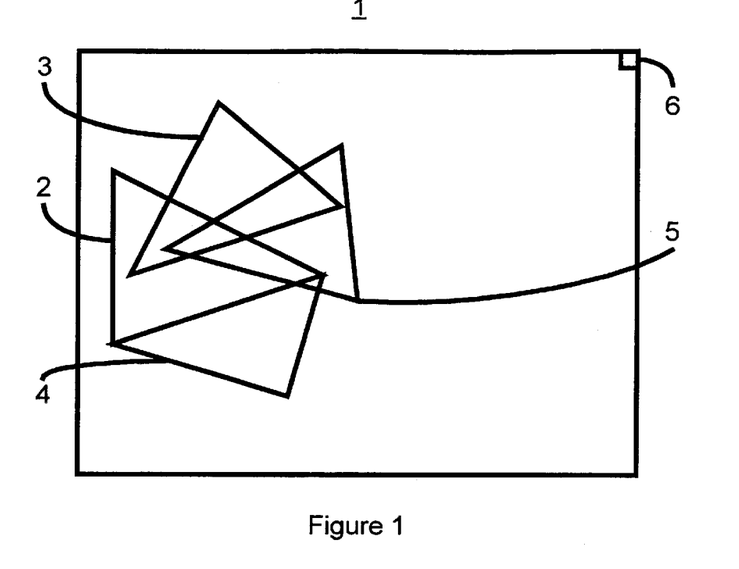
FIG. 1 is a diagram of a display.

FIG. 1 is a block diagram of a display 1 depicting a graphical image. The display includes a plurality of pixels 6, only one of which is labeled. The graphical image includes polygons 2, 3, 4, and 5, which may be part of one or more objects. Each of the polygons 2, 3, 4, and 5 covers several pixels and includes a plurality of fragments. Each fragment includes data for a pixel intersected by the corresponding polygon. Thus, a fragment may include data relating to the color, texture, α values, and depth values for a particular polygon and a particular pixel.

In U.S. patent application Ser. No. 08/624,261, entitled "METHOD AND APPARATUS FOR IDENTIFYING AN ELIMINATING THREE-DIMENSIONAL OBJECTS VISUALLY OBSTRUCTED FORM A PLANAR SURFACE" filed on Mar. 29, 1996 and assigned to the assignee of the present application and in co-pending U.S. patent application Ser. No. 08/624,260, entitled "GRAPHICS PROCESSORS, SYSTEM AND METHOD FOR GENERATING SCREEN PIXELS IN RASTER ORDER UTILIZING A SINGLE INTERPOLATOR" filed on Mar. 29, 1996 and assigned to the assignee of the present application, a method and system for rendering the graphical image in raster order is described. Raster order is from left to right and top to bottom across the display 1. A system which renders the graphical image in raster order and provides antialiasing is described in co-pending U.S. patent application Ser. No. 09/239,413, entitled "METHOD AND SYSTEM FOR PROVIDING EDGE ANTIALIASING" filed on Jan. 28, 1999 and assigned to the assignee of the present application. Applicant hereby incorporates by reference the above-mentioned co-pending applications.

Figure 2:
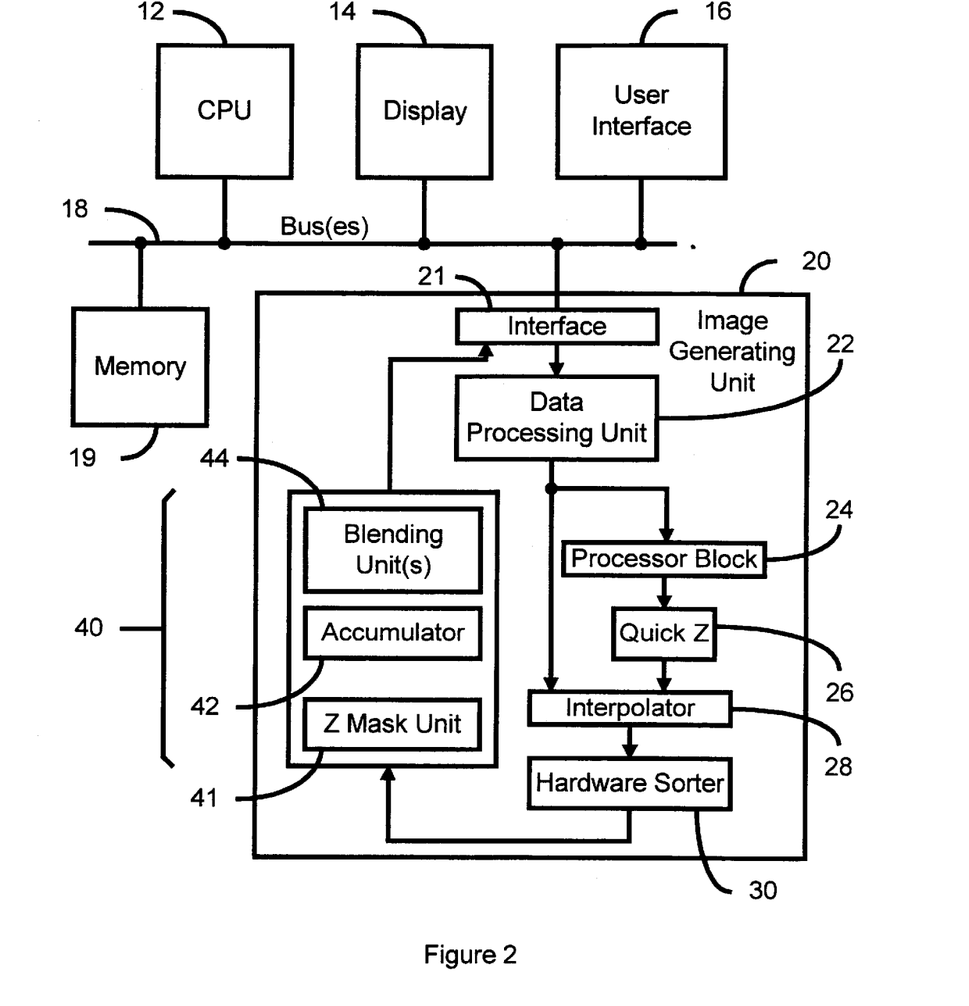
FIG. 2 is a diagram of a system for rendering pixels in raster order while providing antialiasing.

FIG. 2 depicts of a computer system 10 described in the above-mentioned co-pending applications. The computer graphics system 10 includes a central processing unit (CPU) 12, a display 14, a user interface 16 such as a keyboard or mouse or other communicating device, bus(es) 18, a memory 19, and an image generating unit 20 coupled with a bus 17. The display 14 includes a display, such as the display 1. The display 14 could include a display memory (not shown) to which pixels are written. In order to display graphical images, the objects are broken into polygons to be used in rendering the objects. In a preferred embodiment, the polygons are rendered in raster order. That is, portions of the polygons are rendered pixel by pixel in the order of the pixels in the display 14.

The image generating unit 20 is used in rendering the graphical image. The image generating unit includes an interface 21 connected to the bus 17. The interface 21 transmits data to a data processing unit 22. The processor block 24 identifies data describing portions of polygons ("intersecting polygons") which intersect the area extending along a z-axis from a selected pixel in an x-y plane corresponding to a screen of the display 14. The processor block 24 may include a number of processors, allowing intersecting polygons to be processed in parallel. The processor block 24 thus provides and indication of the fragments that intersect a pixel currently being processed. An obstructed object identifier/removal unit (Quick Z) 26 receives at least a portion of the fragment from each intersecting polygon associated with the selected pixel and removes portions of the fragments for intersecting polygons that are obstructed.

The interpolator 28 receives the remaining fragments for the intersecting polygons for the selected pixel and interpolates the data, including interpolating texture, color, and alpha values for the fragment. The interpolator 28 also provides a coverage mask for each fragment. The coverage mask indicates the portion of the pixel that the fragment covers. The fragments for remaining intersecting polygons are provided by the interpolator 28 to a hardware sorter 30. The hardware sorter 30 sorts the fragments for the intersecting polygons based on the value of a key such as the z value, or depth value, for the fragment.

An antialiasing unit 40 performs antialiasing using the mask provided by the interpolator 28. The antialiasing unit 40 may include a z mask unit 41, an accumulator 42, and one or more blending unit(s) 44. The antialiasing unit 40 accumulates data for subpixels within each pixel. Using the coverage mask, data can be accumulated only for those subpixels which the fragment intersects and which may contribute to the subpixel. The data for the subpixels are then combined to provided antialiased data for the pixel. The antialiased data for the selected pixel is provided to the display 14. This process continues for each pixel in raster order as data for different pixels passes through the pipeline of the image generation unit 20.

The above-mentioned co-pending applications thus render the graphical images in raster order, from left to right and top to bottom along the display 14. In order to render the images in raster order, the fragments intersecting a particular pixel are rendered. The fragments intersecting the next pixel in raster order are then rendered. Preferably, the fragments for the pixels pass through most of the pipeline described in the above-mentioned co-pending applications in series.

Although the above-mentioned co-pending applications function well for their intended purpose, greater efficiency in rendering graphical images is desired. Greater coherency would provide higher efficiency. Higher coherency occurs when the same data is used in rendering one pixel as was used for the pixel rendered immediately previously. Coherency is typically lower when rendering the pixels in raster order because it is more likely that data used in rendering a pixel will not be used in rendering the next pixel. For example, when performing texture processing for a pixel, a first texture for a fragment intersecting the pixel is cached. Typically, the first texture will be used for several fragments that are part of the same polygon. When the pixels are rendered in raster order, there is a greater probability that a fragment for the same polygon will not intersect the next pixel being rendered. It is more probable that a second texture will be cached to render the next pixel. Thus, the first texture may be removed from the cache. However, the first texture may be required again when a pixel in the next row, or scan line, is rendered. The first texture may be required because another fragment in the same polygon may intersect one or more pixels in the next row. When the pixel in the next row that requires the first texture is rendered, a cache miss is more likely to occur because the first texture is more likely to have been removed from the cache. Reaching the texture reduces the efficiency rendering the graphical image. Thus, more time is taken to render the graphical image.

The present invention provides a method and system for providing a graphical image on a display. The display includes a plurality of pixels. The data includes a plurality of fragments for the at least one object. The plurality of fragments intersects a first portion of the plurality of pixels. The method and system comprise defining a plurality of macro-pixels. Each of the plurality of macro-pixels includes a second portion of the plurality of pixels. The second portion of the plurality of pixels are adjacent and include n pixels of the second portion of the plurality of pixels in a first direction and m pixels of the second portion of the plurality of pixels in a second direction. The method and system further comprise rendering the plurality of pixels by rendering a plurality of macro-pixels in raster order. In one aspect, each macro-pixel is rendered by rendering the second portion of the plurality of pixels pixel by pixel. Each of the second portion of the plurality of pixels is rendered by rendering the fragments intersecting the pixel. In another aspect, each macro-pixel is rendered by rendering macro-fragments intersecting the macro-pixel. Each macro-fragment intersecting a macro-pixel includes the fragments for a particular polygon that intersect the macro-pixel. The data is then output pixel by pixel. An output for each pixel includes a first portion of the plurality of fragments that intersect the pixel.

The present invention will be described in terms of a particular system. However, one of ordinary skill in the art will readily recognize that this method and system will operate effectively for other systems having other components. Similarly, although discussed in the context of rendering three-dimensional images, the present invention can be used in rendering images having other dimensions.

Figure 3A:
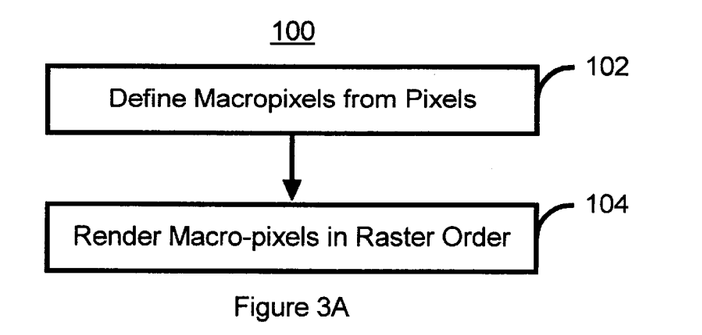
FIG. 3A is a high-level flow chart depicting one embodiment of a method in accordance with the present invention.

To more particularly illustrate the method and system in accordance with the present invention, refer now to FIG. 3A, depicting a high-level flow chart of one embodiment of a method 100 for rendering a graphical image in accordance with the present invention. The method 100 is used for rendering a graphical image on a display, such as the display 1. The display includes a plurality of pixels, such as the pixel 6. The graphical image includes a plurality of objects which preferably include a plurality of polygons, such as the polygons 2, 3, 4, and 5. The graphical image is also described by a plurality of fragments for the objects. The fragments intersect some portion of the pixels in the display. For example, the fragments intersect the pixels which the polygons 2, 3, 4, and 5 intersect.

Figure 3B:
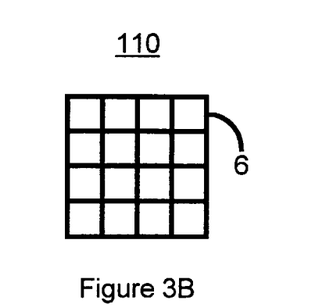
FIG. 3B is a diagram depicting one embodiment of a macro-pixel in accordance with the present invention.

Macro-pixels are defined from the pixels 6, via step 102. The macro-pixels include a portion of the plurality of pixels on the display. The macro-pixel includes pixels in two dimensions. For example, the macro-pixel may include n rows and m columns of pixels. Preferably, the macro-pixel is square in shape, for example being 2×2, 4×4, or 8×8 pixels. In one embodiment, the macro-pixel is four pixels by four pixels. FIG. 3B depicts such an embodiment of a macro-pixel 110. The macro-pixel 110 is four pixels by four pixels, including a total of sixteen pixels. However, in a preferred embodiment, the macro-pixel is eight pixels by eight pixels.

Referring back to FIG. 3A, the macro-pixels are then rendered in raster order, via step 102. In order to render the macro-pixels, each pixel a particular macro-pixel is rendered in step 102. The pixels in the next macro-pixel are then rendered. Thus, using step 102, the macro-pixels are rendered macro-pixel by macro-pixel, from left to right and top to bottom along the display 1. Although the macro-pixels are rendered in raster order, the pixels within each macro-pixel could be rendered in a number of orders. Preferably, the pixels are rendered in one of two ways, discussed below. In a preferred embodiment, step 102 also includes reordering the data rendered so that the data for the graphical image are output pixel by pixel.

Because the macro-pixels are rendered in raster order, the method 100 can be more efficient than rendering individual pixels in raster order. There may be greater coherency between pixels within a macro-pixel because the macro-pixels include pixels in two dimensions. Thus, it is more likely that information used to render one pixel in a macro-pixel will be used to render the next pixel in the macro-pixel. As a result, operations such as those utilizing caching may be more efficient. Once data is stored in a cache, it is more likely to be used again. Consequently, cache hits are more likely using the method 100. Furthermore, if a cache miss occurs, it is more likely that a cache access for the next pixel being rendered would also result in a cache miss. For example, rendering the macro-pixels includes providing texture processing for each pixel with a macro-pixel. Texture processing is made more efficient because once a texture is stored in a cache for use in rendering a pixel, it is more probable that the next pixel will also utilize the texture. Thus, rendering the graphical image is more efficient.

Figure 4A:
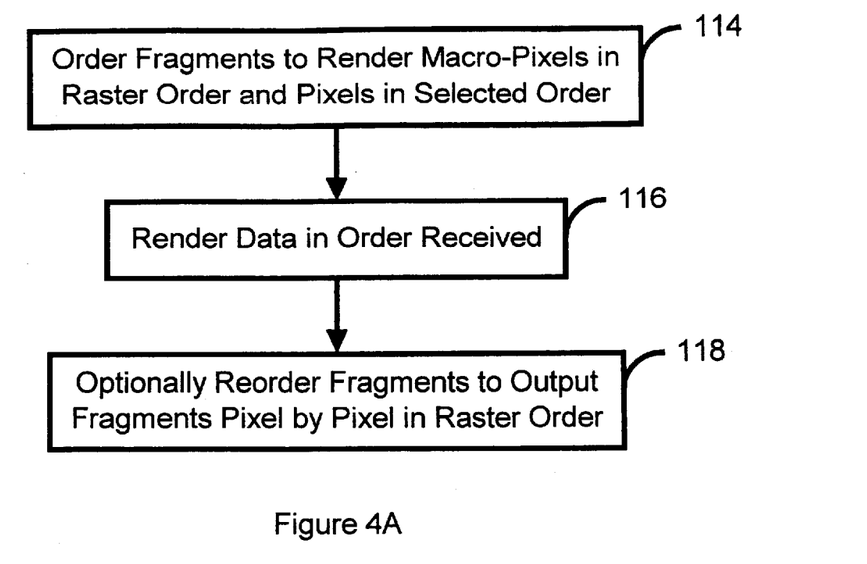
FIG. 4A is a flow chart depicting a first embodiment of a method in accordance with the present invention.
Figure 4B:
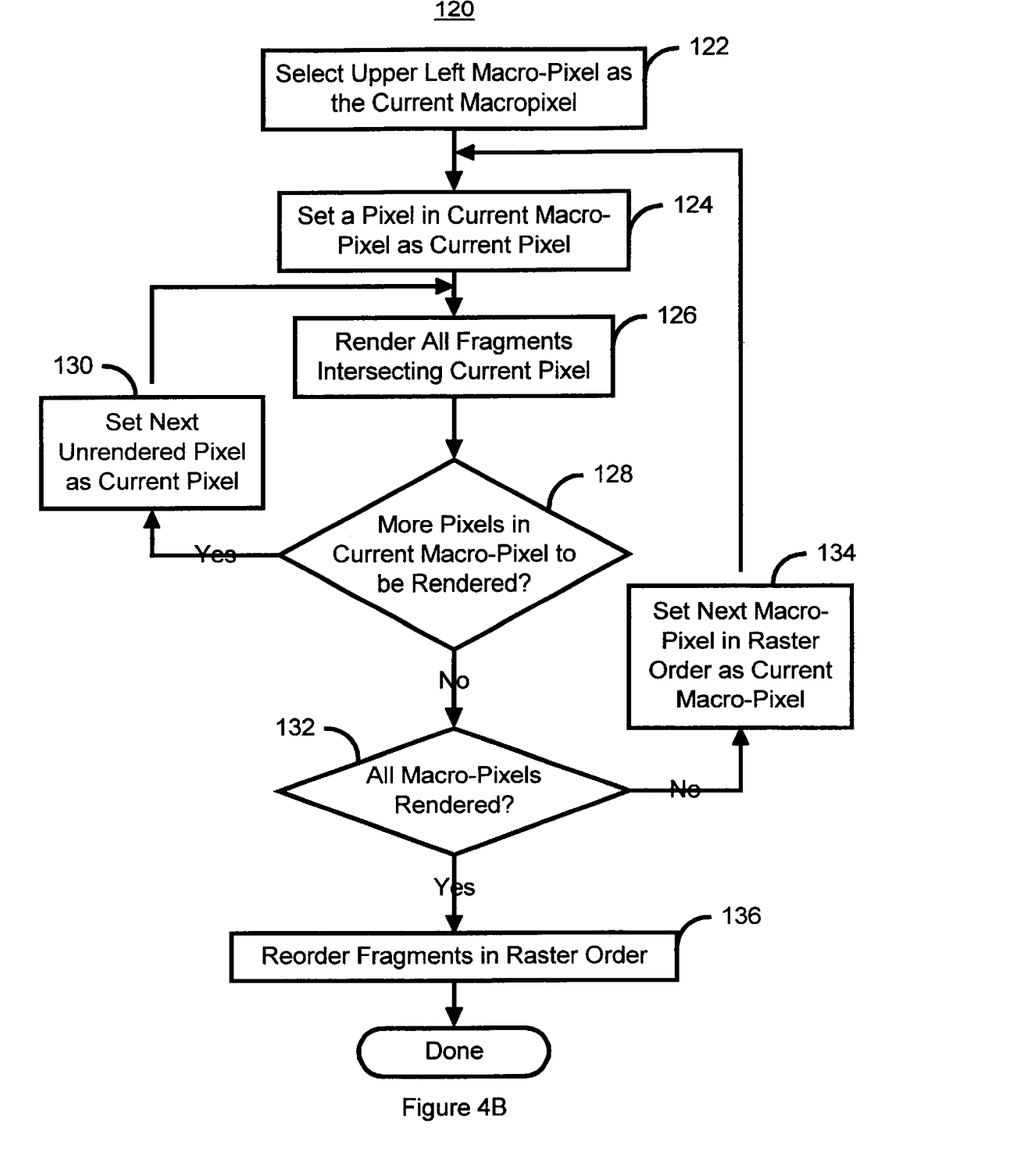
FIG. 4B is a more detailed flow chart depicting the first embodiment of a method in accordance with the present invention.

FIGS. 4A and 4B depict more detailed flow charts of one embodiment of a method for rendering the macro-pixels in raster order. FIG. 4A depicts a first embodiment of a method 112 for rendering the macro-pixels in raster order in which each macro-pixel is rendered by rendering pixels within each macro-pixel pixel by pixel, preferably from left to right and top to bottom of the macro-pixel. FIG. 4B depicts a more detailed flow chart of the first embodiment of a method 120 for rendering the macro-pixels in raster order in which each macro-pixel is rendered by pixels within the macro-pixel pixel by pixel.

Referring now to FIG. 4A, the fragments for the polygons of graphical display are ordered such that the macro-pixels will be rendered in raster order and the pixels within each macro-pixel will be rendered in a particular order, via step 114. In a preferred embodiment, step 114 is accomplished by placing the fragments intersecting pixels in a particular macro-pixel together in series. Thus, the fragments intersecting pixels within the first macro-pixel in the upper left portion of the display 1 are placed together in the pipeline. Fragments intersecting pixels within the next macro-pixel are placed next. In addition, step 114 also preferably orders the fragments intersecting each pixel within a macro-pixel. Consequently, the fragments intersecting the first pixel in a macro-pixel are placed first, followed by fragments intersecting the second pixel to be rendered. In a preferred embodiment, the pixels in a macro-pixel are rendered from left to right and top to bottom in the macro-pixel. Thus, the fragments intersecting the pixel in the upper left corner of each macro-pixel are placed first for that macro-pixel. Also in a preferred embodiment, fragments intersecting different pixels and, therefore, different macro-pixels are differentiated by providing at least on identifier ("id") with each fragment. For example, fragments may be provided with a next ("N") or a last ("L") identifier. The N indicates that the fragment is the next (or first) fragment for a pixel. The L indicates that the fragment is the last fragment to be rendered for a particular pixel. A similar identifier may be provided for macro-pixels or another mechanism for differentiating macro-pixels can be used.

Once the fragments are ordered, the fragments are rendered in the order provided, via step 116. Thus, the macro-pixels will be rendered in raster order, and the pixels within a macro-pixel will be rendered in a selected order. In addition, all of the fragments intersecting a particular pixel will be rendered before a fragment intersecting the next pixel are rendered. If desired, the fragments may then be reordered, via step 118, so that data for pixels are output from left to right and top to bottom along the display 1. Using the method 112, data are preferably processed and output such that a one pixel per clock cycle throughput is maintained under most conditions. Thus, the data for the graphical image may be output pixel by pixel in raster order even though the data was rendered macro-pixel by macro-pixel in raster order rather than being rendered pixel by pixel in raster order. In addition, because the method 112 is accomplished by reordering the data, the method 112 can be accomplished with only minor changes to the system 10.

Referring now to FIG. 4B, a more detailed flow chart of the second embodiment a method 120 for rendering macro-pixels in raster order and pixel-by-pixel is depicted. A first macro-pixel is selected as the current macro-pixel being rendered, via step 122. Preferably, step 122 is performed by determining that an identification ("id") for a fragment indicates that the fragment belongs to the first macro-pixel pixel to be rendered. The first macro-pixel includes the pixels in the upper left corner of the display I because the macro-pixels are rendered in raster order. A pixel in the current macro-pixel is then selected for rendering, via step 124. Preferably, the pixels with in a macro-pixel are rendered from left to right and top to bottom in the macro-pixel. The fragments intersecting the current pixel are then rendered, via step 126. It is then determined whether there are remaining pixels in the current macro-pixel to be rendered, via step 128. If so, then the next pixel is selected as the current pixel, via step 130. The next pixel is preferably the next pixel in order, from left to right and top to bottom in the macro-pixel. Steps 126 and 128 are then repeated. If there are no pixels in the current macro-pixel that remain to be rendered, then it is determined if all macro-pixels have been rendered, via step 132. If not, then the next macro-pixel, in raster order, is selected as the current macro-pixel, via step 134. Steps 124 through 134 are then repeated. If all of the macro-pixels in the display have been rendered, then the data is optionally reordered to be output pixel by pixel in raster order, via step 136. Using the method 120, data are preferably processed and output such that a one pixel per clock cycle throughput is maintained under most conditions.

Figure 4C:
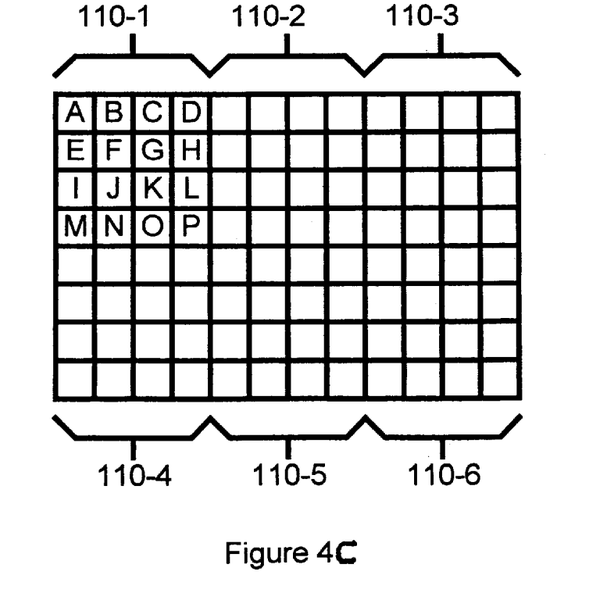
FIG. 4C is a block diagram depicting the order in which pixels and macro-pixels are rendered in the preferred version of the first embodiment of a method in accordance with the present invention.

FIG. 4C depicts several macro-pixels which are rendered in the preferred version of the first embodiment of the method 112 or 120 in accordance with the present invention. For the purposes of explanation, the macro-pixels 110-1 through 110-6 are considered to make up the display 1. The macro-pixels 110-1 through 110-6 each include sixteen pixels. For clarity, only the pixels A through P in the macro-pixel 110-1 are delineated. The macro-pixels 110-1 though 110-6 are rendered in raster order. Thus, the macro-pixel 110-1 is rendered first, followed in order by macro-pixels 110-2, 110-3, 110-4, 110-5 and 110-6. The macro-pixel 110-1 depicts the preferred order in which pixels within each macro-pixel are rendered. The pixels are preferably rendered from left to right and top to bottom in a macro-pixel. Thus, the pixels A through P are preferably rendered in alphabetical order.

Figure 5A:
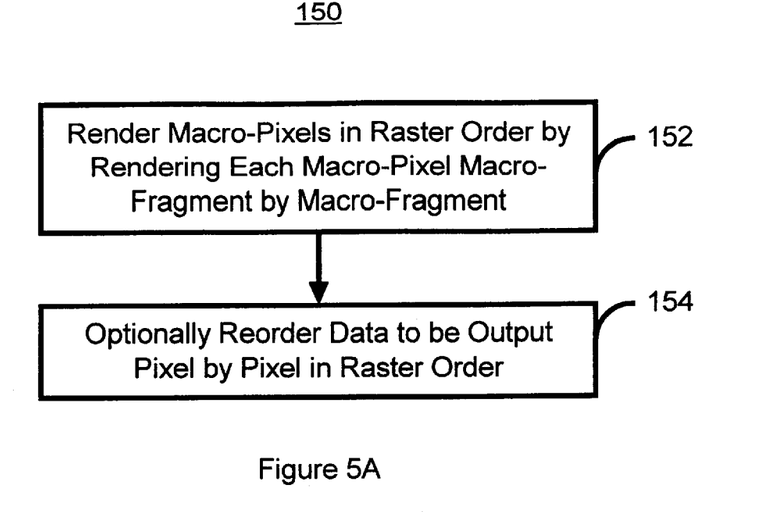
FIG. 5A is a flow chart depicting a second embodiment of a method in accordance with the present invention.

FIG. 5A depicts a second embodiment of a method 150 for rendering the macro-pixels in raster order. Each macro-pixel is rendered by rendering the portions of polygons which intersect the macro-pixel ("macro-fragments") macro-fragment by macro-fragment, via step 152. A macro-fragment includes the fragments that are part of the same polygon and that intersect the macro-fragment. Preferably, step 152 is performed by rendering all the fragments for the same polygon intersecting pixels within the macro-pixel before rendering the fragments for another polygon. Thus, the portions of the polygons which intersect each macro-pixel are rendered together. The data for the macro-fragments are then reordered, via step 154, so that data for pixels are output pixel by pixel, preferably from left to right and top to bottom along the display 1. Thus, the data for the graphical image may be output pixel by pixel in raster order even though the data was rendered macro-pixel by macro-pixel in raster order. Using the method 150, data are preferably processed and output such that a one pixel per clock cycle throughput is maintained under most conditions.

Figure 5B:
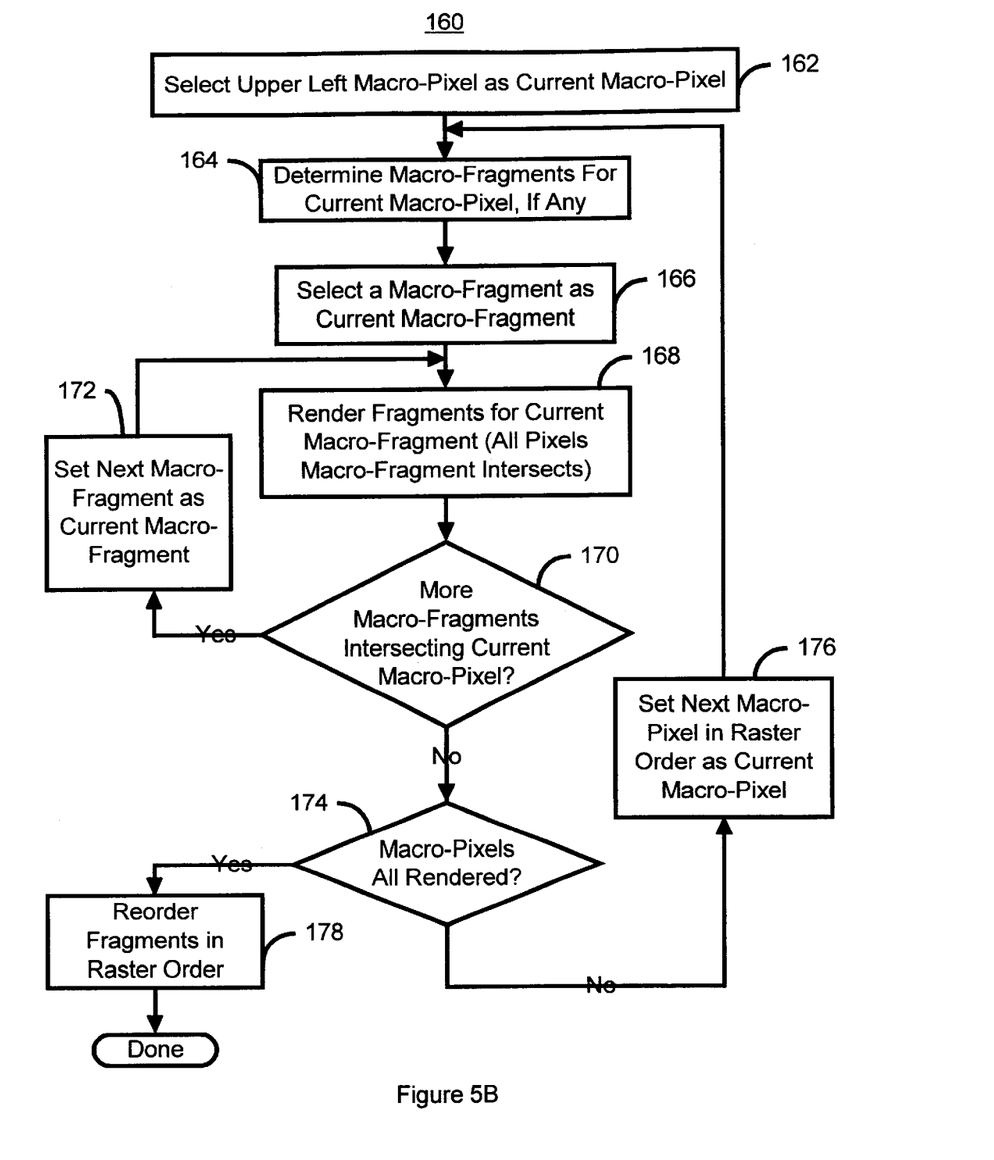
FIG. 5B is a more detailed flow chart depicting the second embodiment of a method in accordance with the present invention.

FIG. 5B depicts a more detailed flow chart of the second embodiment of a method 160 for rendering the macro-pixels in raster order in which each macro-pixel is rendered macro-fragment by macro-fragment. A first macro-pixel is selected as the current macro-pixel being rendered, via step 162. Preferably, step 162 is performed by determining that an identification ("id") for a fragment indicates that the fragment belongs to the first macro-pixel pixel to be rendered. The first macro-pixel includes the pixels in the upper left corner of the display 1 because the macro-pixels are rendered in raster order. The macro-fragments intersecting the current macro-pixel are then determined, via step 164. Preferably, step 164 includes determining the fragments which intersect pixels within the current macro-pixel and determining which fragments intersecting pixels within the macro-pixel are for the same polygon. Note that step 164 could determine that no macro-fragments intersect the current macro-pixel. A macro-fragment in the current macro-pixel is then selected as the current macro-fragment to be rendered, via step 166. The pixels which the current macro-fragment intersects are then rendered, via step 168. Preferably, the pixels within the current macro-fragment are rendered from left to right and top to bottom in the macro-fragment. It is then determined whether there are remaining macro-fragments in the current macro-pixel to be rendered, via step 170. If so, then the next macro-fragment is selected as the current macro-fragment, via step 172. Steps 168 and 170 are then repeated. If there are no macro-fragments in the current macro-pixel that remain to be rendered, then it is determined if all macro-pixels have been rendered, via step 174. If not, then the next macro-pixel, in raster order, is selected as the current macro-pixel, via step 176. Steps 164 through 176 may then be repeated. If all of the macro-pixels in the display have been rendered, then the data is reordered to be output pixel by pixel, preferably in raster order, via step 178. Using the method 160, data are preferably processed and output such that a one pixel per clock cycle throughput is maintained under most conditions.

Figure 5C:
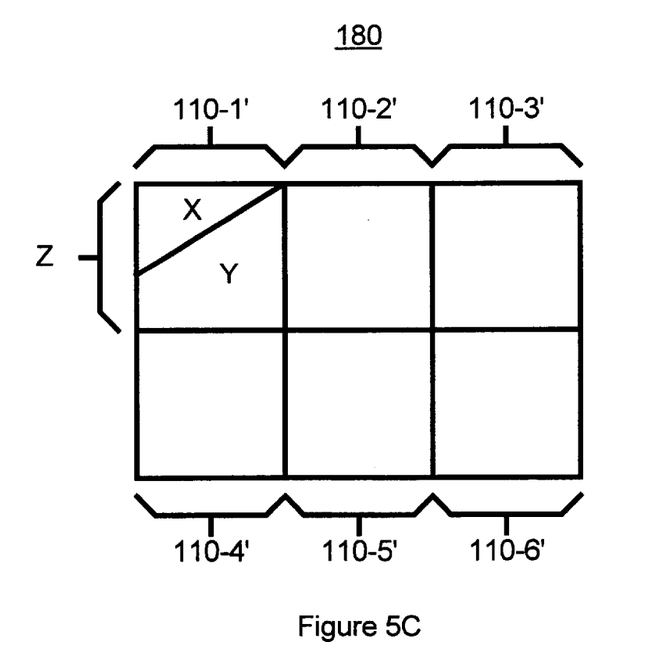
FIG. 5C is a block diagram depicting the order in which macro-fragments and macro-pixels are rendered.

FIG. 5C depicts several macro-pixels which are rendered in the preferred version of the first embodiment of a method in accordance with the present invention. For the purposes of explanation, the macro-pixels 110-1' through 110-6' are considered to make up the display 1. The macro-pixels 110-1' through 110-6' each include sixteen pixels. For clarity, the pixels are not delineated. The macro-pixels 110-1' though 110-6' are rendered in raster order. Thus, the macro-pixel 110-1' is rendered first, followed in order by macropixels 110-2', 110-3', 110-4', 110-5' and 110-6'. The macro-pixel 110-1' depicts the preferred order in which macro-fragments within each macro-pixel are rendered. The macro-pixel 110-1' includes three macro-fragments, X, Y, and Z. Each macro-fragment X, Y, and Z intersects one or more pixels within the macro-pixel 110-1. The fragment Z intersects the entire macro-fragment 110-1. The macro-fragment X is rendered first, followed by the macro-fragment Y, then the macro-fragment Z. Thus, the macro-fragments X through Z are preferably rendered in alphabetical order.

Figure 6:
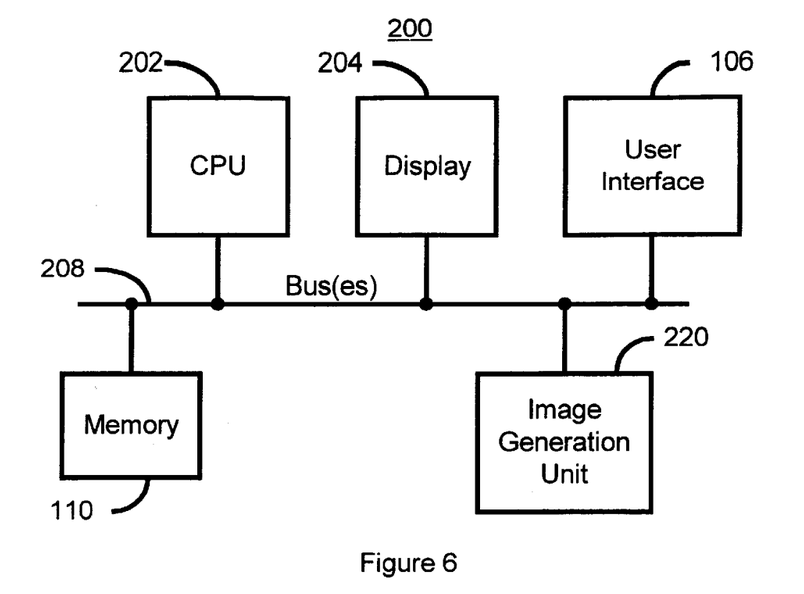
FIG. 6 is a high-level block diagram of a system incorporating the method and system in accordance with the present invention for processing graphical images.

FIG. 6 is a high-level block diagram of a computer graphics system 200 which may utilize the method and system in accordance with the present invention. The computer graphics system 200 includes a central processing unit (CPU) 202, a display 204, a user interface 206 such as a keyboard or mouse or other communicating device, a memory 210, and an image generation unit 220 coupled with one or more buses 208. The display 204 includes a display, such as the display 1. The display 204 could include a display memory (not shown) to which pixels are written. For example, the display 204 could include a frame buffer, a z-buffer, or other display memory. The image generation unit 220 renders the graphical image macro-pixel by macro-pixel, in raster order.

Figure 7:
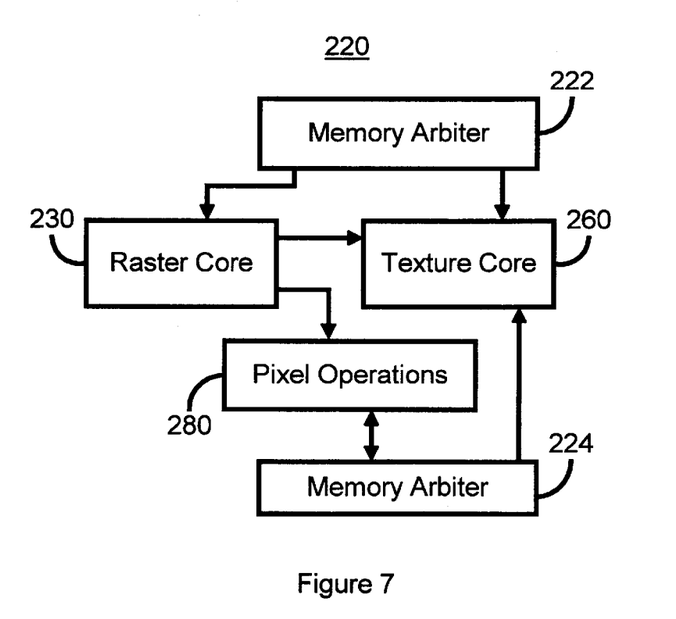
FIG. 7 is one embodiment of an image generation unit in accordance with the present invention.

FIG. 7 depicts a more detailed block diagram of one embodiment of the image generation unit 220. The image generation unit 220 includes memory arbiters 222 and 224. The memory arbiters can control the interaction between the components of the image generation unit 220 and the bus(es) 208 connecting the image generation unit 220 to the remainder of the system 200. The image generation unit 110 includes a raster core 230, a texture core 260, and a pixel operations block 280. The raster core 230 performs most of the operations discussed in the methods 112, 120, 150, and 160. In addition, the image generation unit 220 performs many of the operations of the image generation unit 20 described in the above-mentioned co-pending applications. The texture core 260 aids in performing texture processing. For example, the texture core 260 may include a cache memory for temporarily storing textures, a memory for relatively permanently storing certain textures, or texture processors, not shown in FIG. 7. The pixel operation block 280 may perform several functions including reordering data so that data is output from the image generation unit 220 pixel by pixel in raster order even though the image generation unit 220 renders macro-pixels in raster order.

Figure 8:
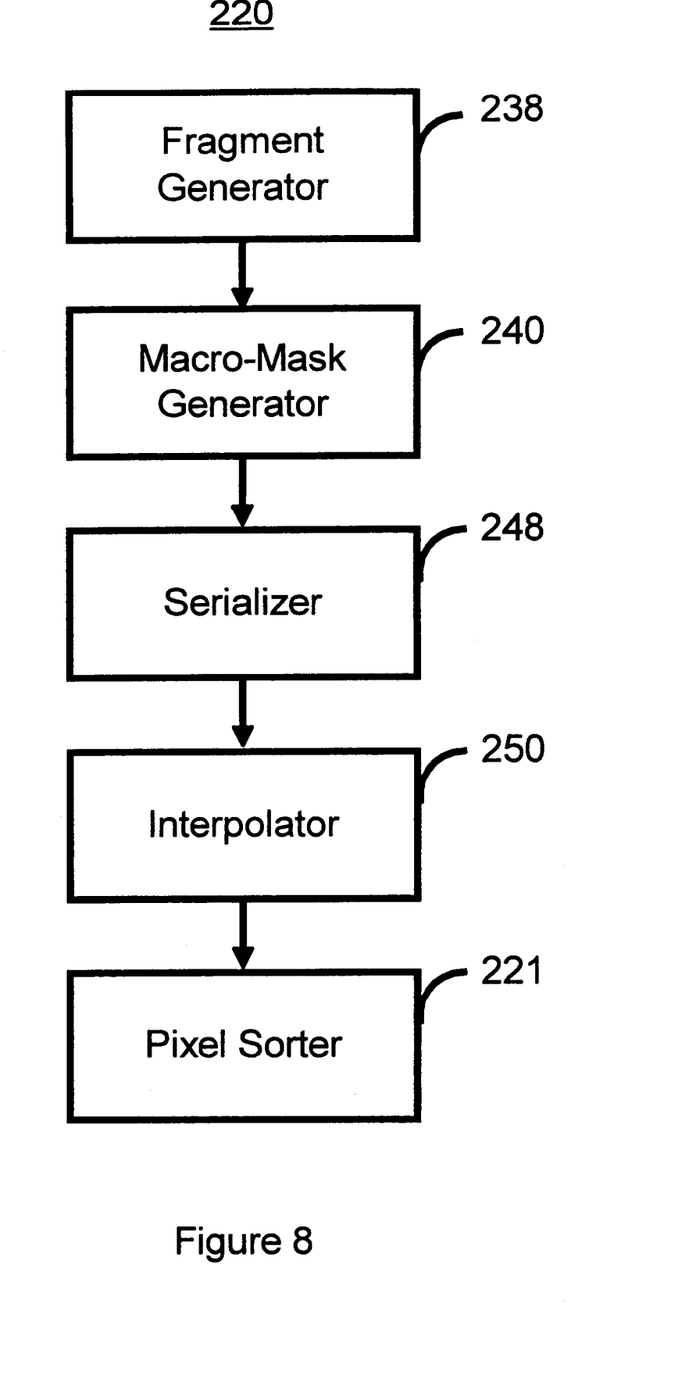
FIG. 8 is a high-level block diagram of a portion of one embodiment of the image generation unit in accordance with the present invention.

FIG. 8 is a block diagram of some components within the raster core 230 and pixel operations block 280 of the image generation unit 220. When the method 150 or 160 renders the macro-pixels, macro-fragment by macro-fragment, all components depicted in FIG. 7 are preferably used. However, when the method 112 or 120 renders the macro-pixels, pixel by pixel, some of the components depicted in FIG. 7 may be omitted or have different functions. The components depicted in FIG. 7 are a fragment generator 238, a mask generation unit 240, a serializer 248, an interpolator 250, and a pixel resort block 221. When used in conjunction with the method 150 or 160, the fragment generator 238 operates on blocks of pixels, the macro-pixel, instead of a single pixel. The fragment generator 238 thus provides a macro-fragment which includes data, such as color, α-values, or other data for a polygon that intersects the macro-pixel. Macro-fragments corresponding to macro-pixels are input to the mask generation unit 248. The mask generation unit 248 generates a mask which indicates the portion of a macro-pixel that a macro-fragment intersects. This mask is similar to the coverage mask, discussed above with respect to FIG. 2, but indicates the pixels of the macro-pixel intersected by a polygon.

The serializer 248 receives the macro-fragments with the associated masks. The serializer 248 utilizes each macro-fragment and mask to provide a series of fragments for the macro-fragment. Each of the fragments corresponds to a particular pixel that is intersected by the macro-fragment. The serializer also places the fragments of the macro-fragment in series, so that the fragments can flow through the remainder of the pipeline and, in a preferred embodiment, be processed so that data for a fragment intersecting a pixel is output approximately every cycle. Preferably, the fragments provided by the serializer each include an index, offsets, and a macro-fragment type. The index associates the fragment with a particular polygon. Thus, the index points to data, such as color or texture, for the fragment. The offsets preferably include a x offset (in the x-direction) and a y offset (in the y-direction). The offsets indicate the position of the pixel in the macro-pixel being rendered. Thus, a fragment having x and y offsets which are both zero could be the upper left pixel in the macro-pixel. Fragments intersecting the remaining pixels in the first row of the macro-pixel will have zero x offsets, but varying y offsets. Fragments intersecting pixels in the first column of the macro-pixel would have zero y offsets, but varying x offsets. The macro-fragment type is used to indicate where in the display the macro-fragment being rendered is located. In a preferred embodiment, the macro-fragment type is either next (N) or last (L). Only the last pixel of the last macro-fragment has a macro-fragment type L.

The interpolator 250 receives fragments from the serializer 248 and performs interpolation for each of the fragments. The interpolator 250 is similar to the interpolator 28 shown in FIG. 2. Referring back to FIG. 8, the serializer 248 allows the interpolator 250 to remain substantially unchanged. In a preferred embodiment, the interpolator includes only a single interpolator. Preferably, data for a particular fragment is interpolated such that a data throughput of one pixel per clock cycle, or one fragment output per clock cycle, can be maintained. Furthermore, in a preferred embodiment, the interpolator 250 provides a coverage mask for each fragment. The coverage mask is used in providing antialiasing. The pixel resort block 221 is optional and logically can include multiple blocks. The pixel resort block 221 can be used to account for the fact that macro-fragments are being rendered macro-fragment by macro-fragment, but other components (not shown) may require data pixel by pixel. Thus, the pixel resort block 221 preferably stores data for multiple pixels, then outputs the data pixel by pixel. Preferably, the pixel resort block 221 stores multiple rows and columns of pixels.

The components depicted in FIG. 7 may have different functions or may be omitted when the data for a macro-pixel is rendered pixel by pixel. When the method 112 or 120 is used to render a graphical image, data for the pixels within a macro-pixel are rendered in a particular order. In a preferred embodiment, data for the pixels are arranged so that the fragments intersecting the first pixel to be rendered are provided first. Data for fragments intersecting the remaining pixels follows in the particular order. Consequently, when the method 112 or 120 is used, the fragment generator 238 provides a similar function to the processor block 22 depicted in FIG. 2. Thus, the fragment generator 238 determines the fragments intersecting a particular pixel within a macro-pixel. Thus, in such a case, the fragment generator 238 operates for fragments intersecting pixels rather than macro-fragments intersecting a macro-pixel. Because fragments intersecting individual pixels are already being utilized the mask generator 240 and serializer 248 are not necessary when the system 200 utilizes the method 112 or 120. The interpolator 250 still functions as described above. However, because data for individual pixels is output from the interpolator 250 in substantially the same order as received, the pixel resort block 221 can be omitted.

Figure 9:
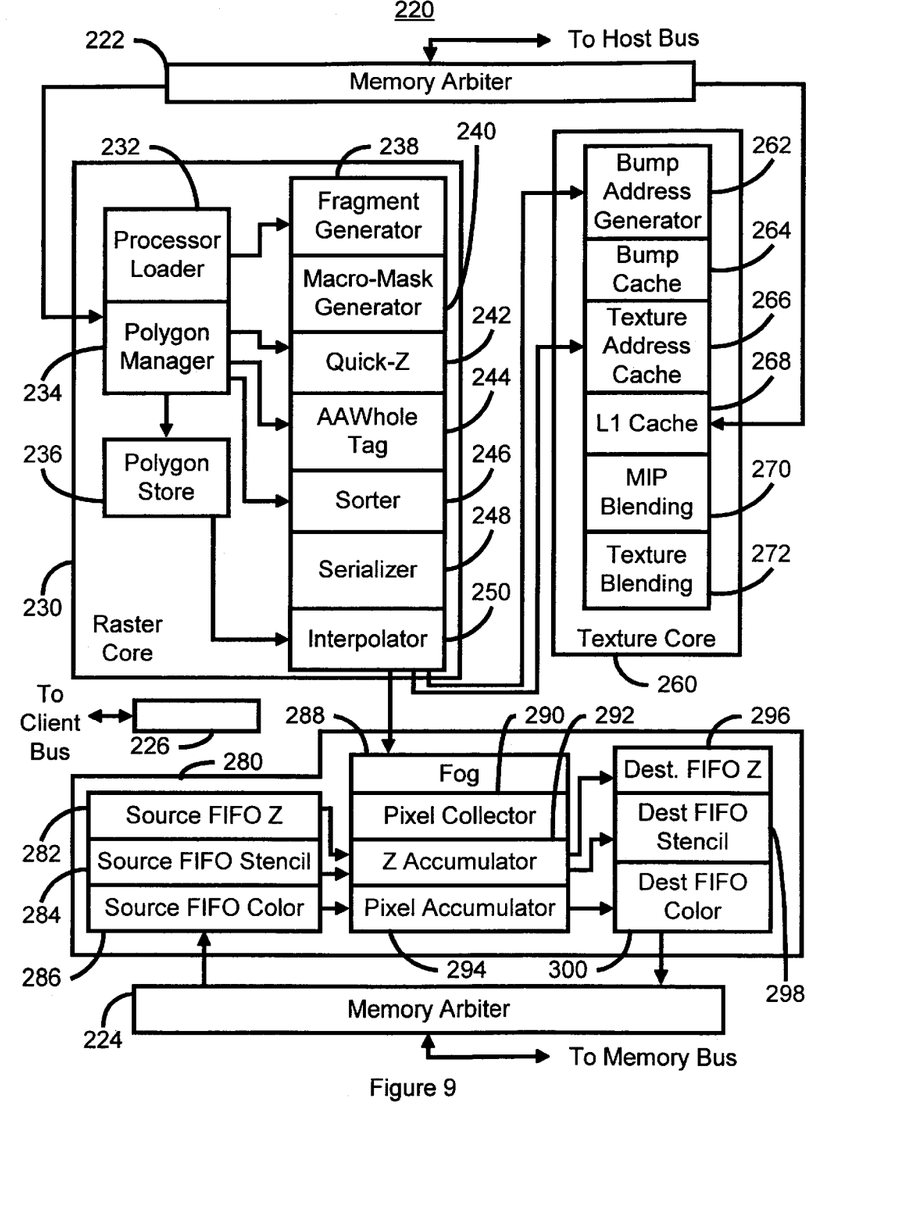
FIG. 9 is a more detailed block diagram of one embodiment of the image generation unit in accordance with the present invention.

FIG. 9 depicts a more detailed block diagram of the components of the image generation unit 220. The image generation includes the raster core 230, the texture core 260, the rendering context 226, the pixel operations block 280, and memory arbiters 222 and 224. The memory arbiter 222 controls interactions between the image generation unit 220 and the host bus 208' (not explicitly shown in FIG. 9). The memory arbiter 224 controls interactions between the image generation unit 220 and the memory bus 208'' (not explicitly shown in FIG. 9). The raster core includes a processor loader 232, a polygon manager 234, a polygon store unit 236, a fragment generator 238, the mask generator 240, an obstructed object identifier and removal unit (Quick Z) 242, an antialiasing tag unit (AA whole tag) 244, sorter 246, the serializer 248, and the interpolator 250. As discussed above, the mask generator 240 and the serializer 248 may not be used if the image generation unit 220 is used in conjunction with the method 112 or 120. The processor 232, polygon manager 234, and polygon store unit 236 correspond to the data processing unit 22 of FIG. 2. Referring back to FIG. 9, the fragment generator 238 corresponds to the processor block 24 of FIG. 2 and is discussed above. In a preferred embodiment, data for pixels within a macro-pixel is processed in parallel regardless of whether the methods 112 and 120 or the methods 150 and 160 are used. Because data for sets of pixels are processed together, multiple clocks can be utilized in processing while still providing a throughput of one pixel per clock cycle. The mask generator 240 also functions as described above.

The AA whole tag 244 of FIG. 9 indicates whether a pixel is fully or only partially covered by a fragment. Thus, the AA whole tag 244 aids in performing antialiasing. The sorter 246 corresponds to the Quick Z 26 depicted in FIG. 2. Referring back to FIG. 9, the sorter 246 thus sorts the fragments or macro-fragments based on a depth value, such as a z value. The serializer 248 and interpolator 250 are discussed above. Note, however, that the present invention is consistent with another type of antialiasing, no antialiasing, another sort, or no sort.

The texture core 260 includes a bump address generator 262, a bump cache 264, a texture address generator 266, a level one cache 268, a multum in parvo ("MIP") blending unit 270 and a texture blending unit 272. Consequently, the texture core 260 allows the image generation unit 220 to process textures. Note, however, that texture processing could be accomplished in another manner, or not provided at all, without substantially affecting the operation of the present invention.

The pixel operations block 280 includes source first in first out ("FIFO") z buffer 282, a source FIFO stencil buffer 284, and a source FIFO color buffer 286, a fog unit 288, a pixel collector 290, a Z accumulator 292, a pixel accumulator 294, a destination FIFO z buffer 296, a destination FIFO stencil buffer 298, and a destination FIFO color buffer 300. Source FIFOs 282, 284, and 286 provide source data to the accumulators 292 and 294. Destination FIFOs 296, 298, and 300 output data for the graphical image. In one embodiment, the data is output to a display memory of the display 204. In another embodiment, data for the graphical image can be provided directly to a display, such as the display 1. In a preferred embodiment, destination FIFOs 296, 298, and 300 output data pixel by pixel in raster order. However, data may not be provided to the FIFOs 296, 298, and 300 pixel by pixel in raster order. For example, data is not provided to the pixel operations block 260 pixel by pixel in raster order. In one embodiment, the FIFOs 282, 284, 286, 296, 298, and 300 can hold data for multiple rows of pixels to output data in raster order. This allows data to be output directly to bypass a display memory, such as a frame buffer. Thus, data for all of the pixels in a particular row of the display 1 can be stored, then output directly to a display in the desired order. However, in another embodiment, the FIFOs 282, 284, 286, 296, 298, and 300 hold sufficient data to allow for efficient memory accesses. Consequently, when the method 150 or 160 is used, the fragments may be reordered prior to use by the z accumulator 292 and pixel accumulator 294.

The z accumulator 292 and pixel accumulator 294 are used in accumulating the fragments for pixels being rendered. The z accumulator 292 and pixel accumulator 294 may also aid in provide antialiasing, for example through the use of a coverage mask. The z accumulator 292 and pixel accumulator 294 could also perform implicit edge antialiasing if depth values for subpixels within a pixel are individually calculated. In one embodiment the z accumulator 292 and pixel accumulator 294 could accumulate data for all pixels in a macro-pixel. For example, a random access memory (RAM) could be used for the z accumulator 292 and another RAM could be used for the pixel accumulator 294. For a macro-pixel that is four pixels by four pixels in size, a sixteen deep RAM could be used for each of the z accumulator 292 and the pixel accumulator 294. In such a case, the pixel collector 292 may be omitted or have reduced functions. In such a case, the z accumulator 292 and pixel accumulator 294 may be considered part of the pixel resort block 221. However, such a RAM is typically not efficient. Thus, a preferred embodiment of the image generation unit 220 may include the pixel collector 290.

In a preferred embodiment, the z accumulator 292 and the pixel accumulator 294 accumulate data for a single pixel. Thus, the z accumulator 292 and pixel accumulator 294 expect all fragments for a particular pixel to be received before data for a subsequent pixel are received. When the method 112 or 120 is used, data from the raster core 230 is provided pixel by pixel. The z accumulator 292 and the pixel accumulator 294 can use data in the order provided by the raster core 230. The pixel collector 290 could thus be omitted when the image generation unit 220 is used in conjunction with the method 112 or 120. However, when the method 150 or 160 is used, the data for pixels are provided in the order each macro-fragment is rendered. Thus, only the fragment for a particular polygon intersecting a first pixel is provided before the fragment for the same polygon is provided for the next pixel. Another fragment intersecting the first pixel is provided later, when the corresponding macro-fragment is rendered. In the preferred embodiment, accumulators 292 and 294 may not properly accumulate data provided in this order. Consequently, the pixel collector 290 is used and considered part of the pixel resort block 221.

The pixel collector 290 is used in reordering the data provided from the raster core 230. When the method 150 or 160 is used, the pixel collector 290 reorders the fragments so that a fragment stream for each of the pixels in a macro-pixel is provided. The fragment stream includes all of the fragments for the corresponding pixel. Thus, data is provided to the z accumulator 292 and pixel accumulator 294 is in a form that can be used by the z accumulator 292 and the pixel accumulator 294, respectively.

Figure 10:
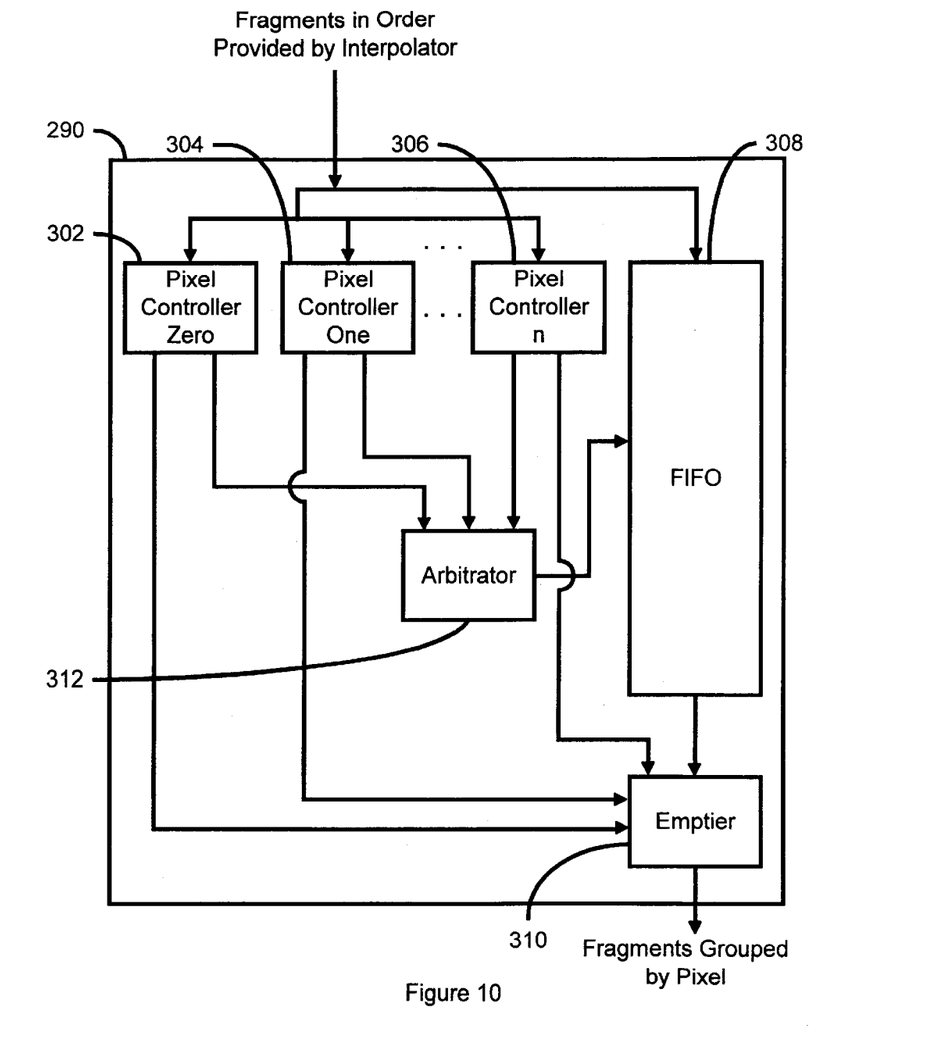
FIG. 10 is a block diagram of a preferred embodiment of the pixel collector in accordance with the present invention.

FIG. 10 depicts one embodiment of the pixel collector 290. The pixel collector 290 includes FIFO 308, an emptier 310, an arbitration unit 312, and a number of pixel controllers. For simplicity, only three pixel controller zero 302, pixel controller one 304, and pixel controller n 306 are depicted. However, the pixel collector 290 includes as many pixel controllers 302, 304 and 306 as there are pixels in a macro-pixel. Thus, each macro-pixel includes n pixels in the system using the pixel collector 290 depicted in FIG. 10. The FIFO 308 includes the same number of FIFOs as the number of pixels in a macro-pixel. For example, for a macro-pixel that is four pixels by four pixels, sixteen FIFOs are included in FIFO 308. In a preferred embodiment, the FIFOs used in the pixel collector 290 are combined into a single instance of RAM, depicted as the FIFO 308 in FIG. 10. Also in a preferred embodiment, each FIFO is considered to be an equal portion of the FIFO 308. However, nothing prevents the FIFOs from being separate. Each pixel controller 302, 304, and 306 controls a corresponding FIFO of the FIFO 308. Thus, as depicted in FIG. 10, each pixel controller 302, 304, and 306 controls 1/16 of the FIFO 308.

Each pixel controller 302, 304, or 306 operates with the corresponding portion of the FIFO 308 to group all the fragments for a pixel in the macro-pixel being processed by the pixel collector 290. Fragments are routed to a particular pixel controller 302, 304, or 306 based on the x offset and y offset of the fragment. The x offset and y offset of the fragment uniquely identify the pixel in the macro-pixel that the fragment intersects. Thus, each pixel controller 302, 304, or 306 receives fragments intersecting a particular pixel. The pixel controllers 302, 304, and 306 route the fragment to the corresponding portion of the FIFO 308 via the arbitration unit 312. Furthermore, in a preferred embodiment, each pixel controller 302, 304 and 306 can track fragments for more than one pixel. Preferably, up to two pixels are tracked by each pixel controller 302, 304, and 406. Consequently, the pixel collector 290 can simultaneously process portions of two macro-pixels. This aids in ensuring that the desired throughput of one pixel per clock cycle is maintained.

In one embodiment, there is a fixed amount of memory for the portion of the FIFO 308 corresponding to a particular pixel controller 302, 304, or 306. In a preferred embodiment, an overload state may be invoked if the portion of the FIFO 308 for a pixel controller 302, 304, or 306 runs out of space before all fragments for the corresponding pixel have been provided. The overload state for a pixel controller 302, 304, or 306 provides the fragments for the corresponding pixel in the corresponding portion of the FIFO 308 to the z accumulator 292 and the pixel accumulator 294 depicted in FIG. 9. However, in such a case, results from the z accumulator 292 and pixel accumulator 294 are provided back to the pixel collector 290 rather than to some portion of the display 204. This process can be repeated so that all fragments for the pixel will be grouped together. However, if this overload state is used and the z accumulator aids in providing antialiasing, the z accumulator 292 may use a region-based algorithm during the overload state. This may reduce the amount of time required to fill the z accumulator 292, which can include a buffer for each subpixel in the pixel being processed. Without such a region based algorithm, a z-value may be separately calculated for each subpixel buffer to provide implicit edge antialiasing. Thus, the region based algorithm aids in reducing the time required to group fragments for a pixel corresponding to a pixel controller 302, 304, or 306 that has been processed.

Thus, macro-pixels are rendered in raster order. However, data may be output from the image generation unit 20 in a different order, for example pixel by pixel in raster order. Greater coherency can be achieved between data for a particular pixel being rendered and data for a subsequent pixel because the macro-pixels being rendered are composed of pixels occupying two dimensions. The increase in coherency is particularly great where each macro-pixel is rendered macro-fragment by macro-fragment via the method 150 or 160 rather than using a particular order for the pixels as in the method 112 or 120. For example, if data such as a texture is cached for rendering a particular pixel within a macro-pixel, there is a greater probability that the data in the cache will be used for rendering a subsequent pixel. Similarly, if a cache miss occurs, there is a greater probability that a cache miss would occur for a subsequent pixel. Rendering of a graphical image is thereby improved in efficiency. The improvement is particularly great where a level two cache is used. This is because a level-two cache has a relatively large cache-line size that requires a relatively long time to fill. However, the method and system in accordance with the present invention can also improve efficiency for other caches. In addition, data for more than one pixel can be processed at a particular time. For example, the fragment generator 238 can perform processing for all pixels and multiple fragments in the macro-pixel simultaneously. Thus, several clock cycles may can be used to perform the desired processing without adversely affecting throughput.

A method and system has been disclosed for rendering a graphical image. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a graphical image on a display from data describing at least one object, the display including a plurality of pixels, the data including a plurality of fragments for the at least one object, the plurality of fragments intersecting a first portion of the plurality of pixels, a portion of the plurality of fragments intersecting each pixel of the first portion of the plurality of pixels, the method comprising the steps of:

(a) defining a plurality of macro-pixels, each of the plurality of macro-pixels including a second portion of the plurality of pixels, the second portion of the plurality of pixels being adjacent and including n pixels of the second portion of the plurality of pixels in a first direction and m pixels of the second portion of the plurality of pixels in a second direction;

(b) rendering the plurality of pixels by rendering the plurality of macro-pixels in raster order by rendering each pixel of the second portion of the plurality of pixels in each macro-pixel pixel by pixel, each pixel being rendered by rendering the portion of the plurality of fragments intersecting each pixel;

wherein the plurality of macro-pixels are adjacent, non-overlapping and completely covers the display and wherein the second portion of the plurality of pixels in each of the plurality of macro-pixels are rendered in raster order regardless of a size and number of the at least one object; and wherein the at least one object includes a plurality of sizes and a plurality of objects.

2. The method of claim 1 further comprising the step of:
(c) outputting the data for all of the display pixel by pixel in raster order.

3. The method of claim 1 further comprising the step of:
(c) ordering the plurality of fragments such that each macro-pixel is rendered in raster order and each pixel of the second portion of the plurality of pixels in each macro-pixel is rendered in a selected order.

4. A method for providing a graphical image on a display from data describing at least one object, the display including a plurality of pixels, the at least one object including a plurality of polygons, the plurality of polygons including the plurality of fragments, each pixel of a first portion of the plurality of pixels being intersected by a first portion of the plurality of fragments the method comprising the steps of:
(a) defining a plurality of macro-pixels, each of the plurality of macro-pixels including a second portion of the plurality of pixels, the second portion of the plurality of pixels being adjacent and including n pixels of the second portion of the plurality of pixels in a first direction and m pixels of the second portion of the plurality of pixels in a second direction;
(b) providing a plurality of macro-fragments including the plurality of fragments and intersecting the plurality of macro-pixels, each macro-fragment including a second portion of the plurality of fragments, the second portion of the plurality of fragments intersecting a polygon of the plurality of polygons which intersects the macro-pixel;
(c) rendering the plurality of pixels by rendering the plurality of macro-pixels in raster order, each of the plurality of macro-pixels being rendered based on the portion of the plurality of macro-fragments;
(d) outputting the plurality of pixels pixel by pixel, an output for each pixel including the first portion of the plurality of fragments;
wherein the plurality of macro-pixels are adjacent, non-overlapping and completely covers the display and wherein the second portion of the plurality of pixels in the plurality of macro-pixels are rendered in raster order regardless of a size and number of each of the plurality of polygons; and
wherein the plurality of polygons includes a plurality of sizes.

5. The method of claim 4, wherein the macro-fragment providing step (b) further includes the step of:
(b1) providing a plurality of masks for the plurality of fragments, the plurality of masks defining the plurality of macro-fragments.

6. The method of claim 5, wherein the rendering step (c) further includes the step of:
(c1) rendering a portion of the plurality of macro-fragments intersecting each macro-pixel.

7. The method of claim 6, wherein the macro-fragment rendering step (c) further includes the step of: (c1i) using a mask corresponding to a macro-fragment of the portion of the plurality of macro-fragments intersecting a particular macro-pixel to render each pixel in the macro-fragment;
(c1ii) repeating step (c1i) for each remaining macro-fragment in the portion of the plurality of macro-fragments intersecting the particular macro-pixel.

8. The method of claim 4, wherein the macro-pixels are rendered in raster order and data for the plurality of pixels are output in raster order.

9. A system for generating a graphical image on a display from data describing a plurality of polygons, the display including a plurality of pixels, the system comprising:

a fragment generator for providing a plurality of macro-fragments intersecting a plurality of macro-pixels, each of the plurality of macro-pixels including a portion of the plurality of pixels, the portion of the plurality of pixels being adjacent and including n pixels of the portion of the plurality of pixels in a first direction and m pixels of the portion of the plurality of pixels in a second direction, a portion of the plurality of polygons intersecting each of the plurality of macro-pixels, each of the plurality of macro-fragments corresponding to a macro-pixel of the plurality of macro-pixels, each of the plurality of macro-fragments corresponding to a portion of a polygon of the portion of the plurality of polygons intersecting each of the plurality of macro-pixels;

a mask generator coupled with the fragment generator, the mask generator for providing a plurality of masks for the plurality of macro-fragments, the plurality of masks indicating intersections between the plurality of macro-fragments and the plurality of macro-pixels;

a serializer coupled with the mask generator, the serializer for determining a plurality of fragments for each of the plurality of macro-pixels, each of the plurality of fragments intersecting a pixel of the portion of the plurality of pixels in each of the plurality of macro-pixels;

an interpolator coupled with the serializer, the interpolator for interpolating a portion of the plurality of fragments for each macro-fragment of each macro-pixel; and means for resorting a portion of the plurality of fragments for each of the plurality of pixels so that a portion of the plurality of fragments for each of the portion of the plurality of pixels is grouped pixel by pixel;

wherein the plurality of macro-pixels are rendered in raster order; and wherein the plurality of macro-pixels are adjacent, non-overlapping and completely covers the display and wherein the portion of the plurality of pixels in each of plurality of macro-pixels are rendered in raster order regardless of a size and number of each of the plurality of polygons; and wherein the plurality of polygons includes a plurality of sizes.

10. The system of claim 9, wherein the resorting means further include:
a pixel collector coupled with the interpolator, the pixel collector for sorting the portion of the plurality of fragments for the plurality of pixels to be grouped pixel by pixel.

11. The system of claim 9, wherein the resorting means further include:
an accumulator coupled with the interpolator, the accumulator for sorting the portion of the plurality of fragments for the plurality of pixels to be grouped pixel by pixel and for collecting data for the plurality of pixels.

12. The system of claim 10, further comprising:
means, coupled with the resorting means, for outputting the plurality of fragments for all of the display pixel by pixel in raster order.

13. A system for providing a graphical image on a display from data describing at least one object, the display including a plurality of pixels, the data including a plurality of fragments for the at least one object, the plurality of fragments intersecting a first portion of the plurality of pixels, a portion of the plurality of fragments intersecting each pixel of the first portion of the plurality of pixels, the system comprising:

means for defining a plurality of macro-pixels, each of the plurality of macro-pixels including a second portion of the plurality of pixels, the second portion of the plurality of pixels being adjacent and including n pixels of the second portion of the plurality of pixels in a first direction and m pixels of the second portion of the plurality of pixels in a second direction;

means, coupled with the macro-pixel defining means, for rendering the plurality of pixels by rendering the plurality of macro-pixels in raster order, each of the macro-pixels being rendered by rendering each pixel of the second portion of the plurality of pixels in each macro-pixel pixel by pixel, each pixel being rendered by rendering the portion of the plurality of fragments intersecting each pixel;

wherein the plurality of macro-pixels are adjacent, non-overlapping and completely covers the display and wherein the second portion of the plurality of pixels in each of the plurality of macro-pixels are rendered in raster order regardless of a size and number of the at least one object; and wherein the at least one object includes a plurality of sizes and a plurality of objects.

14. The system of claim 13 wherein each macro-pixel intersects a portion of the plurality of fragments, the portion of the plurality of fragments intersecting the second portion of the plurality of pixels, wherein the plurality of pixels on the display are arranged into a plurality of rows and a plurality of columns;

wherein the defining means further includes means for reordering the portion of the plurality of fragments for each macro-pixel so that the portion of the plurality of fragments are provided for the portion of the plurality of pixels from left to right and top to bottom in each macro-pixel; and wherein the system further includes at least one buffer for storing data for a second portion of the plurality of pixels, the second portion of the plurality of pixels including a portion of the plurality of rows of the display.

* * * * *